(12) United States Patent
Muppirala

(10) Patent No.: US 11,615,282 B2
(45) Date of Patent: Mar. 28, 2023

(54) SYSTEM AND METHOD FOR REMOTE IDENTIFICATION OF HEMS

(71) Applicant: Ravikumar Muppirala, Ann Arbor, MI (US)

(72) Inventor: Ravikumar Muppirala, Ann Arbor, MI (US)

( * ) Notice: Subject to any disclaimer, the term of this patent is extended or adjusted under 35 U.S.C. 154(b) by 0 days.

(21) Appl. No.: 17/254,621

(22) PCT Filed: Jun. 20, 2019

(86) PCT No.: PCT/IB2019/000766
§ 371 (c)(1),
(2) Date: Dec. 21, 2020

(87) PCT Pub. No.: WO2019/243895
PCT Pub. Date: Dec. 26, 2019

(65) Prior Publication Data
US 2021/0125015 A1    Apr. 29, 2021

Related U.S. Application Data

(60) Provisional application No. 62/688,464, filed on Jun. 22, 2018.

(51) Int. Cl.
*G06K 19/07* (2006.01)
*G06K 19/077* (2006.01)
*G06Q 50/26* (2012.01)

(52) U.S. Cl.
CPC ............ *G06K 19/0723* (2013.01); *G06K 19/07758* (2013.01); *G06Q 50/26* (2013.01)

(58) Field of Classification Search
CPC ......... G06K 19/0723; G06K 19/07758; G06Q 50/26
See application file for complete search history.

(56) References Cited

U.S. PATENT DOCUMENTS 8,754,751 B1    6/2014    Picolli
2005/0026275 A1    2/2005    Bahoric
(Continued)

OTHER PUBLICATIONS

PCT International Search Report, International Application No. PCT/IB2019/000766 (dated Jan. 14, 2020).
(Continued)

*Primary Examiner* — Laura A Gudorf
(74) *Attorney, Agent, or Firm* — Barnes & Thornburg LLP

(57) ABSTRACT

A system and method for remote identification of a driver of a vehicle includes a processor, an output device in communication with the processor, an RFID receiver in communication with the processor, and a network access device in communication with the processor. The processor is configured to transmit the received RFID to a database via the network access the device and receive from the database the name of a person or item associated with the RFID device and criminal history of the person or the item associated with the RFID device. The processor is configured to provide to an operator of the law enforcement vehicle the name of a person or item associated with the RFID device and the criminal history of the person or the item associated with the RFID device and provide a warning how to engage the person or the item associated with the RFID device.

16 Claims, 7 Drawing Sheets

(56) References Cited

U.S. PATENT DOCUMENTS

| | | |
|---|---|---|
| 2005/0088320 A1 | 4/2005 | Kovach |
| 2005/0262751 A1 | 12/2005 | Leslie |
| 2006/0214783 A1* | 9/2006 | Ratnakar .............. G08G 1/0175 |
| | | 340/505 |
| 2008/0068170 A1 | 3/2008 | Ehrman et al. |
| 2013/0033386 A1* | 2/2013 | Zlojutro ................. G08G 1/127 |
| | | 340/935 |
| 2013/0187760 A1* | 7/2013 | Teran-Matus .......... G06Q 10/08 |
| | | 340/10.1 |
| 2016/0267451 A1* | 9/2016 | Eid ...................... G06Q 20/308 |

OTHER PUBLICATIONS

PCT Written Opinion of the International Searching Authority, International Application No. PCT/US2019/000766 (dated Jan. 14, 2020).

Post & Parcel, "DHL Demos RFID-Enabled Delivery Van" (Mar. 8, 2007), available at https://postandparcel.info/16934/news/dhl-demos-rfid-enabled-delivery-van/.

\* cited by examiner

SYSTEM AND METHOD FOR REMOTE IDENTIFICATION OF ITEMS

CROSS RELATED APPLICATIONS

This application claims the benefit of U.S. Provisional Patent Application No. 62/688,464 filed Jun. 22, 2018, the content of which is hereby incorporated by reference in its entirety.

BACKGROUND

1. Field of the Invention

The present invention generally relates to systems and methods for identification of items, including persons, vehicles, and weapons.

2. Description of Related Art

Currently, in order to identify a driver of a vehicle pulled over by a law enforcement officer, the law enforcement officer must exit his/her patrol car and come into close contact with the driver of the vehicle that is pulled over. Thereafter, the law enforcement officer asks the driver of the vehicle for identification. From there, the law enforcement officer must then return to his/her patrol car and enter the appropriate information received from the driver of the vehicle pulled over by the law enforcement officer into a mobile data terminal.

This has several drawbacks. First, as best shown in FIG. 1A, a patrol car 10 has pulled over a vehicle 12. Both the patrol car 10 and the vehicle 12 have pulled off the side of a road 14. In this situation, the law enforcement officer 16 is shown slipping and falling while they are either on their way to engage the driver of the vehicle 12 or on their way to returning to their patrol car 10 after engaging the drive of the vehicle 12. This creates a situation that is unsafe for the officer 16, especially when weather is poor.

Referring to FIG. 1B, another dangerous situation is illustrated where the officer 16 is hit by another vehicle 18 travelling on the road 14. This situation is quite common, as the driver of the vehicle 18 may not be aware of the situation ahead on the road 14. The driver of the vehicle 18 may not have appropriate time so as to be able to slow down and make sure persons, such as the law enforcement officer 16, are not in the roadway. Again, this creates an unsafe situation for the law enforcement officer.

Additionally, it has been noted that when law enforcement officers come into close contact with drivers of vehicles, the interaction between these two parties may not be as civil as idealized. Moreover, an altercation could arise between the law enforcement officer 16 and the driver of the vehicle 12, wherein the officer 16 uses force to apprehend or restrain the driver of the vehicle 12. Additionally, the law enforcement officer 16 may be unaware that the driver of the vehicle 12 is armed with a weapon, putting the law enforcement officer in even greater danger. This altercation between the law enforcement officer 16 and the driver of the vehicle 12 can create several unfortunate circumstances that result in harm done to either the law enforcement officer 16 and/or the driver of the vehicle 12.

SUMMARY

A system and method for remote identification of items includes a processor, an output device in communication with the processor, an RFID receiver in communication with the processor, and a network access device in communication with the processor. The processor is configured to transmit the received RFID to a database via the network access the device and receive from the database the name of a person or item associated with the RFID device and criminal history of the person or the item associated with the RFID device. The processor is configured to provide to an operator of a law enforcement vehicle the name of a person or item associated with the RFID device and the criminal history of the person or the item associated with the RFID device and provide a warning how to engage the person or the item associated with the RFID device.

Also disclosed is a system wherein one or more vehicles each are configured to transmit RFID signals into the environment. In addition to transmitting RFID signals, the one or more vehicles may also be configured to receive these transmitted RFID signals from vehicles. Essentially, this allows the vehicles to communicate to each other so as to provide vehicle information to each other. This could be important in a non-law enforcement type setting, when the vehicles have the ability to know the location of each vehicle by both the presence and strength of the RFID signals received by each vehicle.

Further objects, features, and advantages of this invention will become readily apparent to persons skilled in the art after a review of the following description, with reference to the drawings and claims that are appended to and form a part of this specification.

DETAILED DESCRIPTION

Figure 1A:
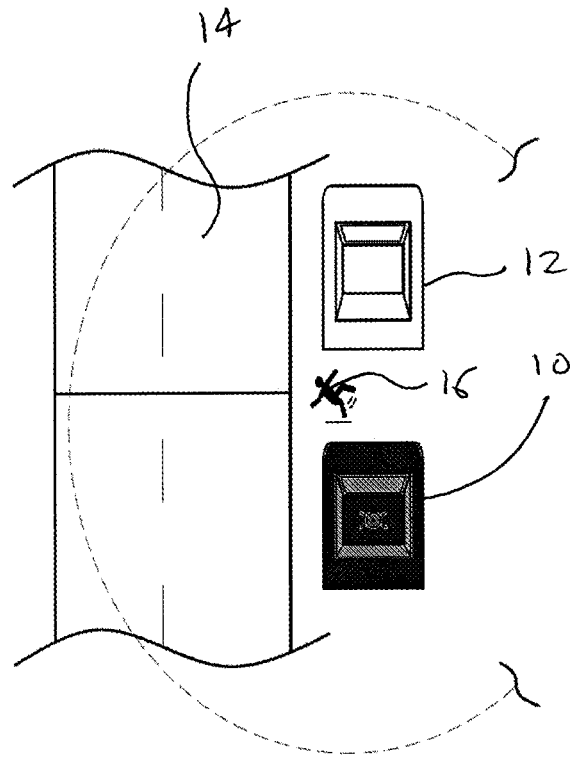
FIG. 1A illustrates a prior art situation wherein a law enforcement officer is injured when traveling between a patrol car in a vehicle.
Figure 1B:
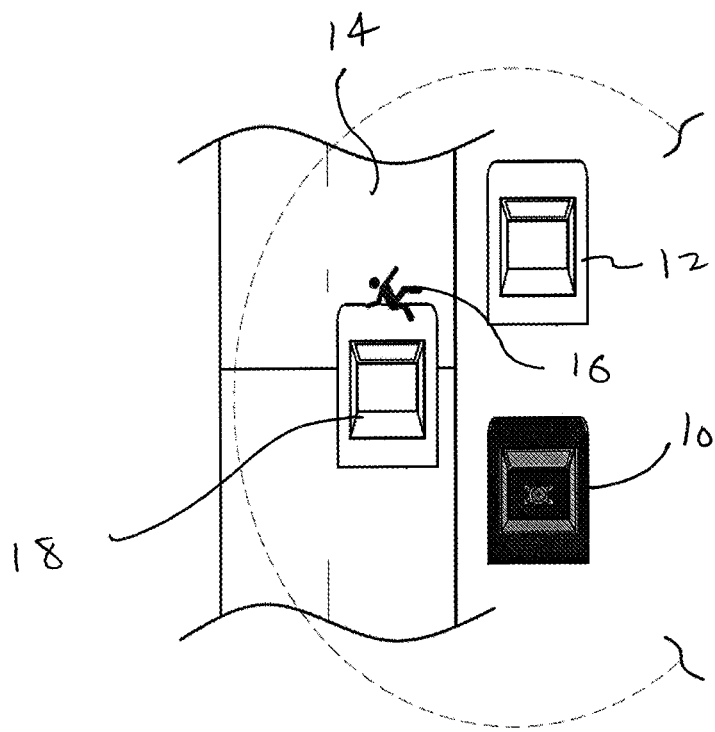
FIG. 1B illustrates a prior art situation wherein a law enforcement officer is injured by a vehicle traveling on a road.
Figure 2:
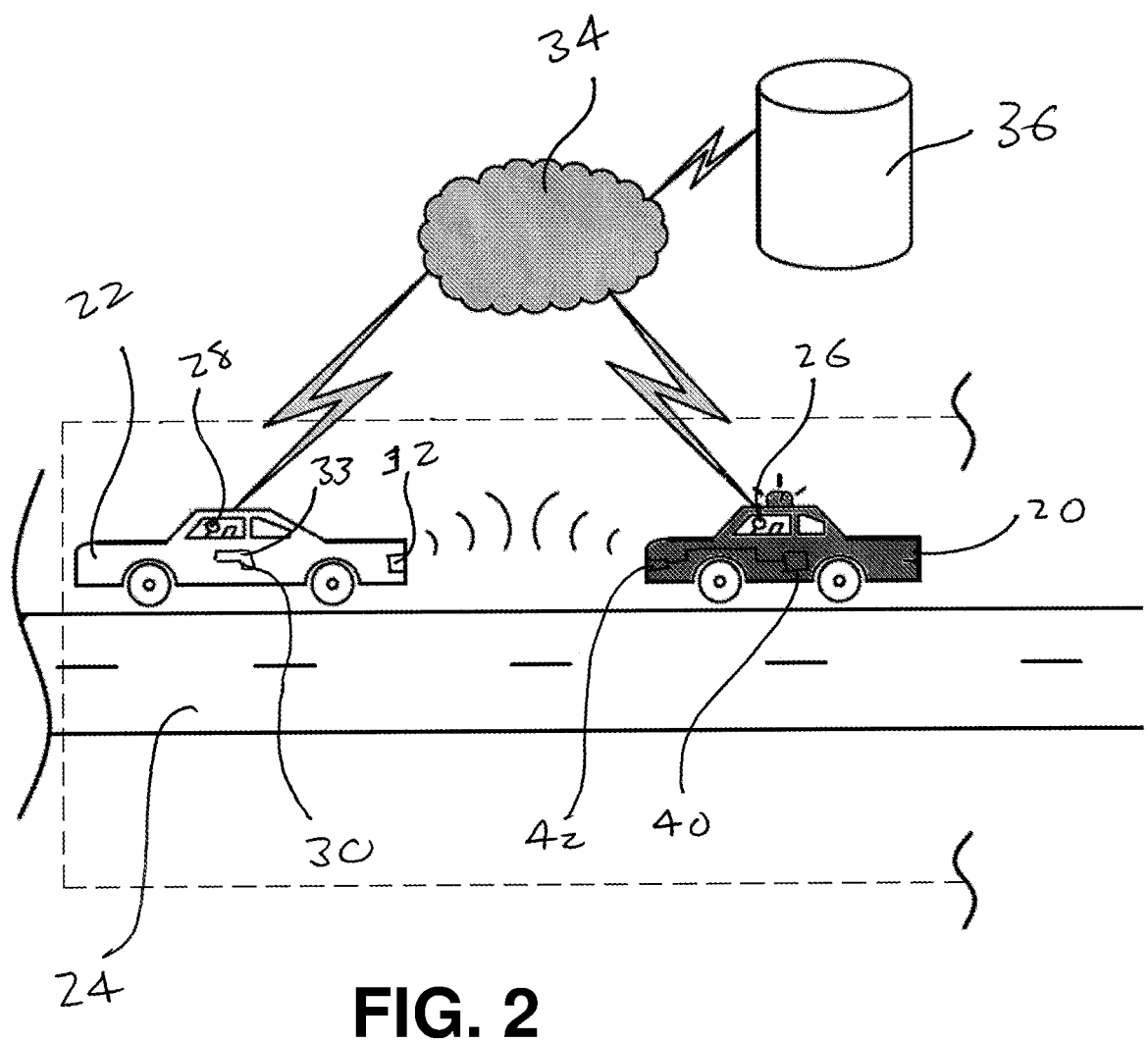
FIG. 2 illustrates the system for identifying items, such as vehicles, weapons, and/or persons.

FIG. 2 illustrates a situation incorporating the system and method for remote identification of a driver of a vehicle. Here, the patrol car 20 is operated by a law enforcement officer 26. The patrol car 20 has pulled over another car 22 containing a suspect 28. Located within the other car 22 is a weapon 30, in this case, a handgun. Both the vehicle 22 and the patrol car 20 were traveling on a road 24, but are now pulled over off the side of the road 24. The vehicle 22 includes an RFID tag 32 located on the vehicle 22. The RFID tag may be a passive RFID tag that only transmits data in response to an external signal or may be an active RFID tag that is always transmitting an RFID signal. Additionally, the weapon 30 may also include an RFID tag 33. Generally, the RFID tag 33 is a passive RFID tag but could also be an active RFID tag as well.

The patrol car 20 includes the system 40 for remote identification of the suspect 28 and/or the weapon 30 using the RFID tags 32 of the vehicle and 33 of the weapon 30. Here, the system 40 is in communication with the RFID receiver 42 that receives the RFID identifiers from the RFID tags 32 and 33. The RFID tag 32 identifies the vehicle, while the RFID tag 33 identifies the weapon 30. After receiving this information, the system 40 provides the RFID's from the tags 32 and 33 to a database 36 via a network 34. The network 34 may be any type of network but is generally a distributed network such as the internet. The database, after receiving these RFID tags cross references these RFID's with data entries associated with these RFID's. These data entries could include any which one of a number of different types of data. For example, as related to the RFID tag 32 or the vehicle 22, the data associated with this RFID tag 32 could include make and model of the vehicle, owner of the vehicle, any criminal acts involving the vehicle or the owners of the vehicle, and so on and so forth. In addition, the RFID data entries associated with the weapon 30 could include weapon registration information, ownership information, if the weapon was stolen, any criminal acts associated with the weapon, and so on and so forth. As will be better explained in the paragraphs that follow, the system 40 can then utilize this information to determine if there is an unsafe situation where the law enforcement officer 26 should call for back up or proceed as usual. In addition, the system disclosed in this application could be combined with another system, such as a system for remote identification of person as shown and described in International Application PCT/US2017/056874, which is herein incorporated by reference in its entirety.

It should be understood that data transmitted to the database 36 via the network 34 could be transmitted in an encrypted fashion. Moreover, as it is it is well known, encryption is the process of encoding a message or information in such a way that only authorized parties can access it and those who are not authorized cannot. It should be understood that any data transmitted or received and described in this application may be encrypted or unencrypted. As such, this includes data being transmitted to or from the vehicle 22, the police vehicle 26, the database 36, and/or the weapon 33. The purpose for this encryption is to provide protection to personal data.

Figure 3:
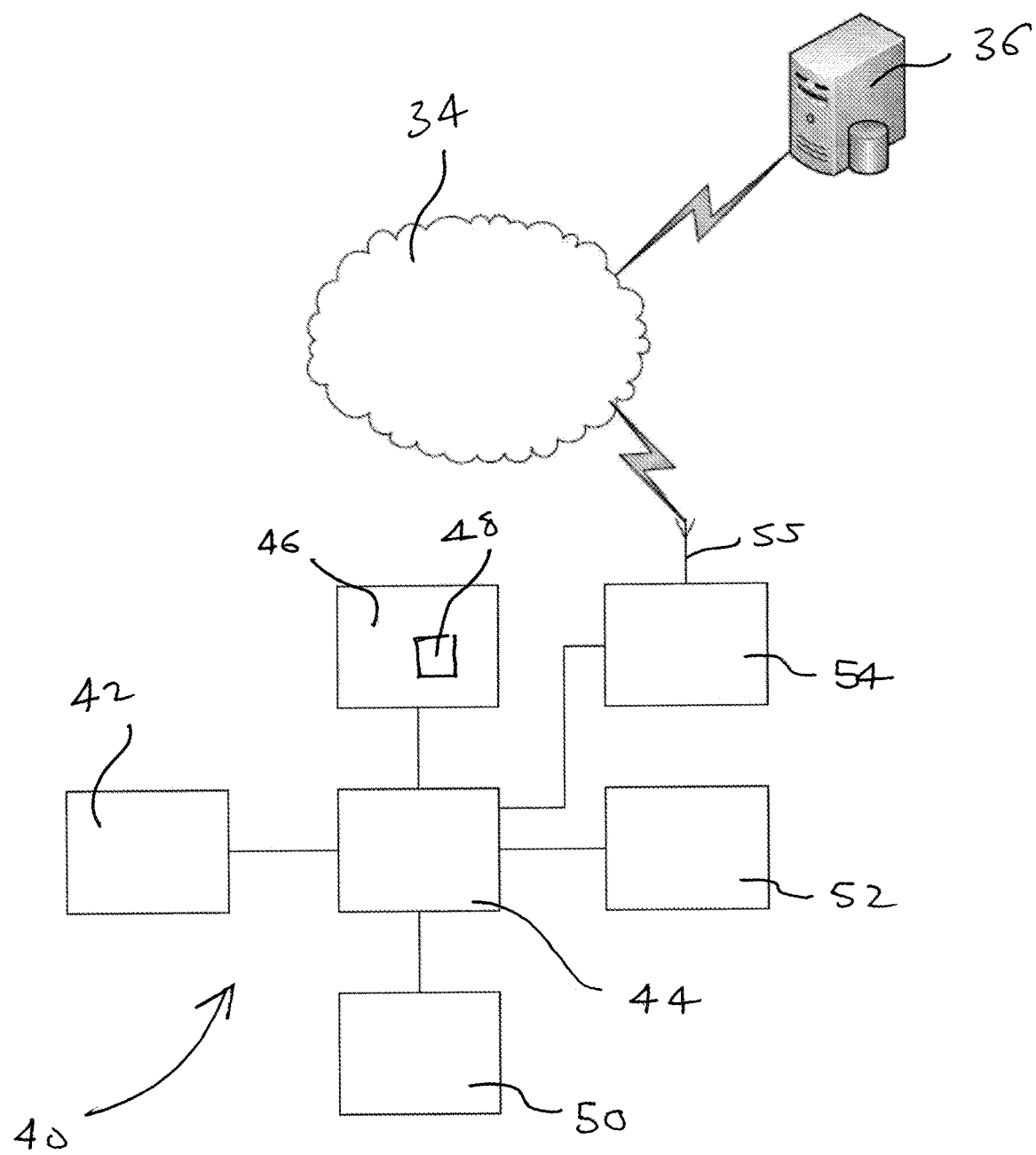
FIG. 3 is a more detailed illustration of the system of FIG. 2

Referring to FIG. 3, a more detailed view of the system 40 is shown. Here, the system 40 includes a processor 44. The microprocessor may be a single processor or may be multiple processors working in concert. In communication with the processor 44 is a memory device 46 containing instructions 48. The memory device 46 may be any memory device capable of storing digital information. As such, the memory device may be an optical memory device, a magnetic memory device, such as a hard drive, or a solid-state memory device. The instructions stored within the memory device 46 configure the processor to perform any, which one of the number of different methods disclosed in this application. It should also be understood that the memory device 46 may be incorporated within the processor 44 and not separately as shown.

Also in communication with the processor 44 is an input device 50 and an output device 52. The input device 50 could be any one of a number of different input devices that allow the law enforcement officer to provide data to the processor 44. As such, the input device could be a keyboard, pointing device, microphone, and the like. The output device 52 can be any output device capable of delivering data to the law enforcement officer 26. As such, the output device may be a display or could be an audible output device.

A network access device 54 is also in communication with the processor 44. The network access device 54 allows the processor 44 to communicate with the network 34 and in turn, the database 36. Generally, the network access device 54 may also include an antenna 55 so as to allow data to be communicated from the system 40 to the database 36 using a wireless communication system.

Figure 4A:
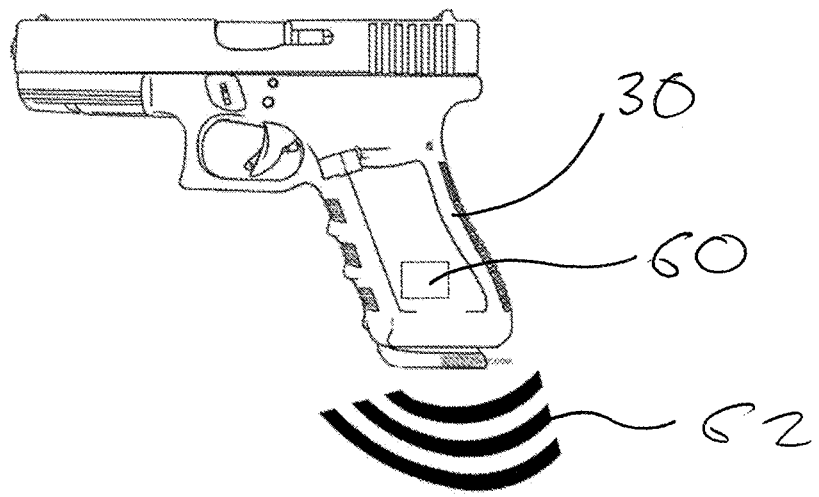
FIG. 4A illustrates a weapon having an RFID tag.
Figure 4B:
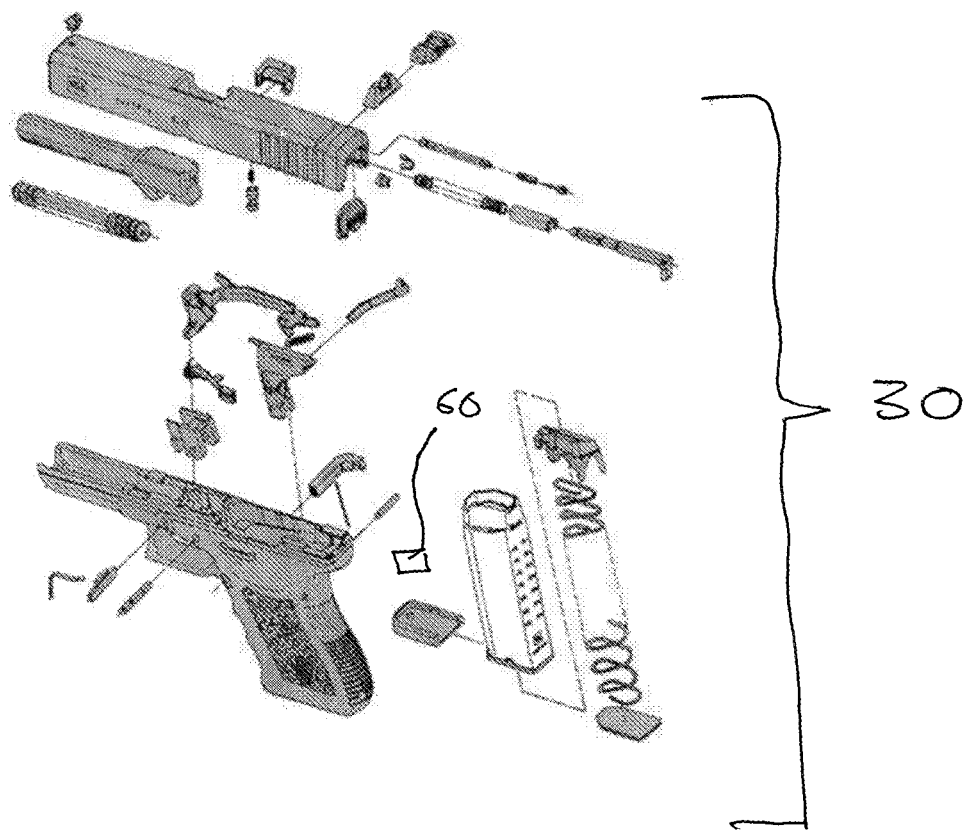
FIG. 4B illustrates an exploded view of the weapon of FIG. 4A.

FIGS. 4A and 4B illustrate one embodiment of the weapon 30. It should be understood that the weapon 30 could be any type of weapon. In this embodiment, the weapon 30 is a handgun, but the weapon 30 could be an assault style riffle, pistol, handgun, or any device capable of inflicting harm on a person when operated by another person. Here, the weapon 30 includes an RFID tag 60 that emits an RFID signal 62. The RFID tag 60 may be a passive RFID tag, but it should be understood it may also be an active RFID tag as well. FIG. 4A illustrates the RFID tag 60 being mounted on or within the handle of the weapon 30. However, as shown in FIG. 4B, any of the parts of the exploded view of the weapon 30 could include the RFID tag 60. As such, it should not be understood that the RFID tag is placed in one specific portion of the weapon 30 but could be located in any one of a number of different portions of the weapon. Additionally, the weapon 30 may include multiple RFID tags so as to prevent a person from removing one of the RFID tags to prevent the weapon 30 from being remotely identified.

Figure 5A:
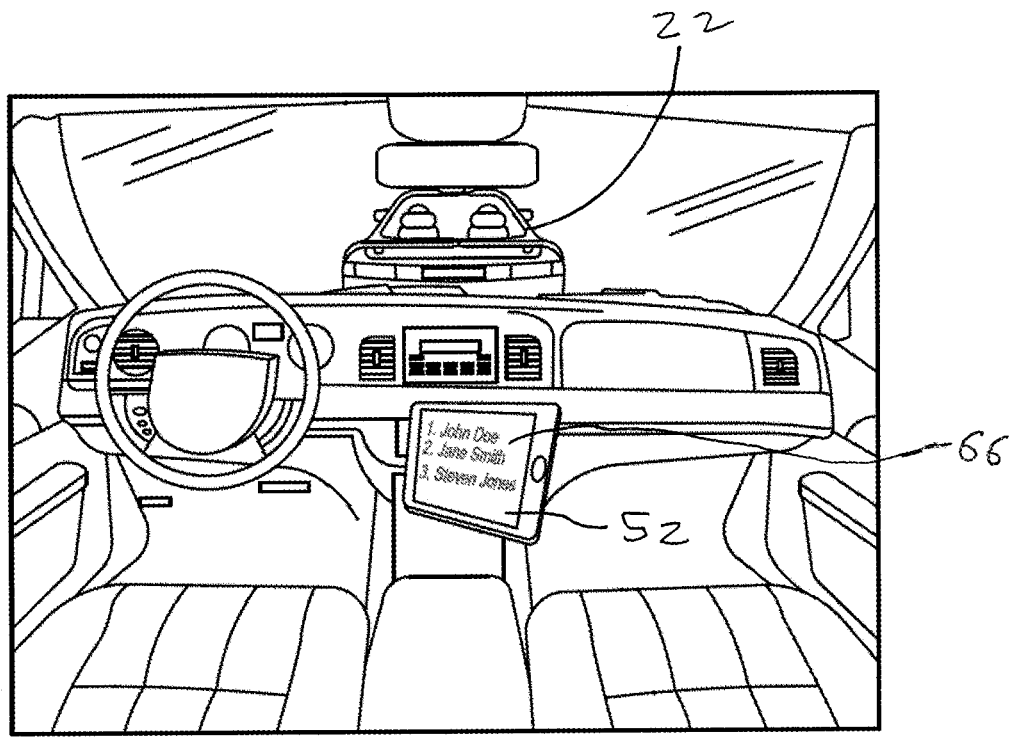
FIG. 5A illustrates the interior of a patrol vehicle having an output device identifying persons associated with the RFID tag of a vehicle.
Figure 5B:
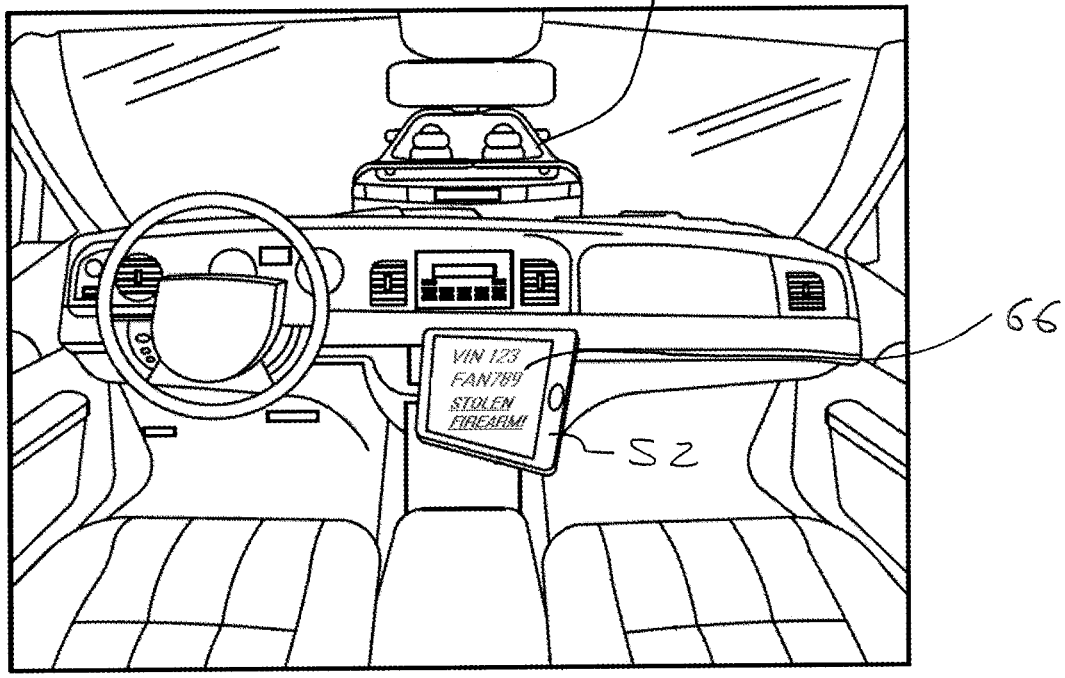
FIG. 5B illustrates the interior of the patrol vehicle of FIG. 5A, wherein the output device provides a warning to the law enforcement officer.

Referring to FIGS. 5A and 5B, the interior of the patrol car 10 is shown. Here, the interior includes an output device having a display area 66. Here, the system 40 is shown and described in the previous paragraphs and figures receives the RFID signals from the vehicle 22 and from any weapon located within the vehicle 22. The RFID signals from the vehicle 22 may be active or passive RFID signals. These RFID's are then provided to the system and transmitted to the database, which then provides the system information associated with the RFID's. As shown in FIG. 5A, the display area 66 shows the names associated with either the vehicle or the weapon. FIG. 5B illustrates the vehicle identification of the vehicle and also shows a firearm identification number as well. Here, the system 40 has determined that the firearm is stolen and provides a warning to the law enforcement officer in the display area that the firearm is stolen. From here, the officer can proceed more cautiously, such as calling for backup or other actions so as to reduce harm to the law enforcement officer or the driver of the vehicle 22.

Figure 6:
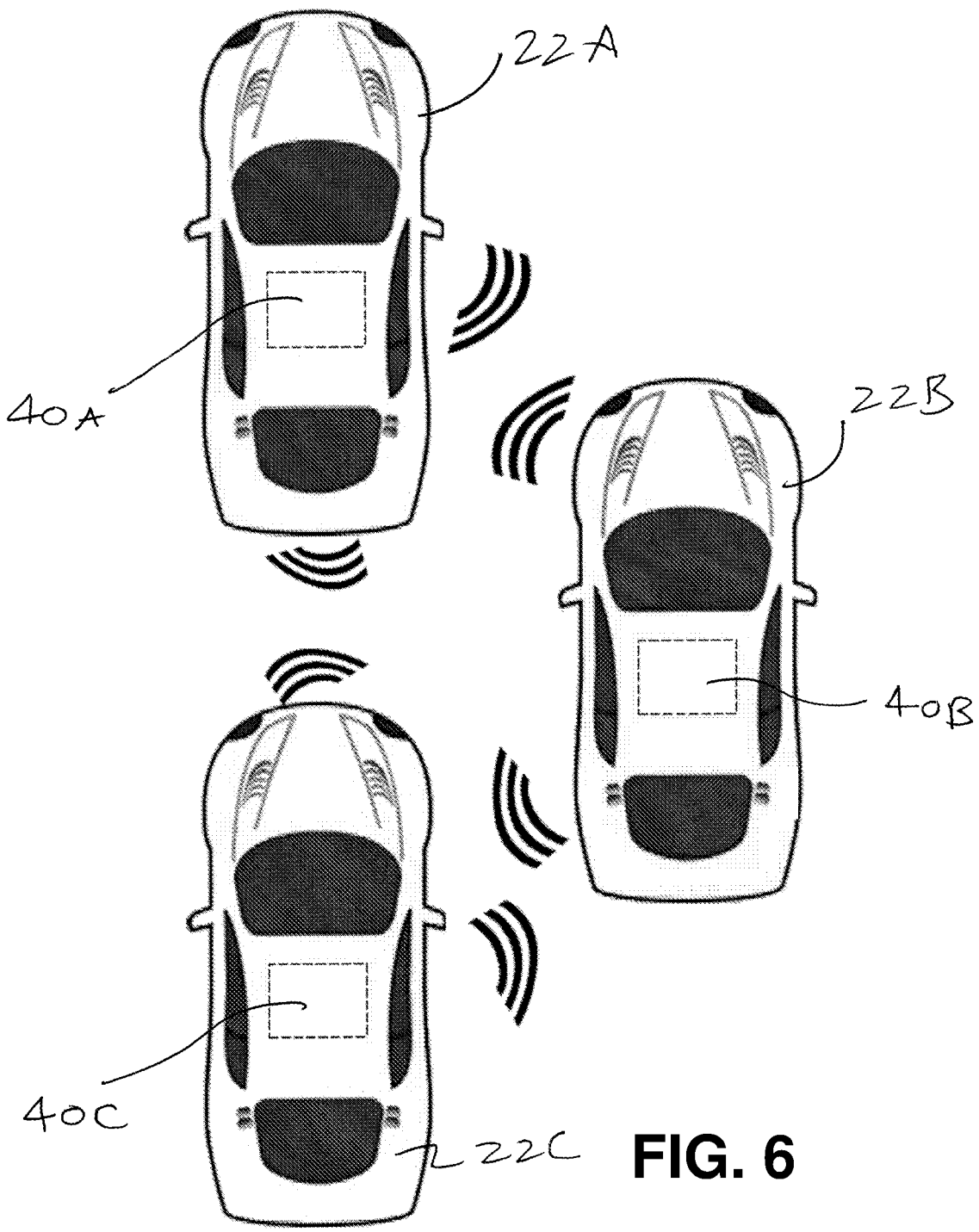
FIG. 6 illustrates a system wherein vehicles have each have RFID tags another vehicle to determine the presence of the other vehicles by utilizing the other vehicles' RFID tags.

FIG. 6 illustrates three vehicles 22A, 22B, and 22C. Each of the vehicles include the system 40A, 40B, and 40C, respectively. Here, the vehicles 22A, 22B, and 22C each are transmitting RFID signals into the environment and essentially to each other. As such, the vehicle 22A is receiving RFID signals from the vehicle 22B and the vehicle 22C, the vehicle 22B is receiving RFID signals from the vehicle 22A and the vehicle 22C, and, finally, the vehicle 22C is receiving RFID signals from the vehicle 22A and 22B. Essentially, this allows the vehicles to communicate to each other so as to provide vehicle information to each other. This could be important in a non-law enforcement type setting, when the vehicles have the ability to know the location of each vehicle by both the presence and strength of the RFID signals received by each vehicle.

As such, for example, the vehicle 22A can determine that the vehicle 22B and 22C are near it and take appropriate action in the form of some type of autonomous driving application. Therefore, the vehicles 22A, 22B, and 22C, in addition to sensors that provide information around the surrounding environment can also use information regarding the presence of RFID signals transmitted from vehicles located in the environment as well. So, vehicle 22A, based on signals received from vehicle 22B, could determine that it is inappropriate at the present time to change to a lane to the right of the vehicle 22A based on the presence and strength of the RFID signals emitted by the vehicle 22B. Likewise, in a situation where the vehicle 22A is slowing down or stopping, the vehicle 22C, based on the strength and presence of RFID signals emitted from the vehicle 22A, could determine that it is appropriate for the vehicle 22C to slow down or change its heading so as to avoid striking vehicle 22A.

Additionally, it should be understood that the system described in this specification could also be utilized to identify a hit and run driver. For example, let us assume that vehicle 22A is struck by vehicle 22C. The vehicle 22A could record the RFID of the vehicle 22C and store this information for later retrieval. This storage of the information could be triggered by sensors located within the vehicle 22A that are configured to detect an impact from an external object. Upon detecting an impact from an external object, the vehicle 22A could be configured so as to record any RFID's detected in the area and the signal strength of any RFID's detected. By so doing, law enforcement or other forensic services could utilize this stored RFID information to determine the identity of the hit-and-run driver or the driver's vehicle.

Also, it should be understood that a system could be devised such that a person in possession of a mobile device, such as a mobile phone, tablet, or smartwatch, could have the mobile device configured such that the mobile device is capable of detecting RFID's emitted from the vehicles 22A, 22B, and/or 22C. If one of the vehicles 22A, 22B, and/or 22C strikes a person in possession of such a mobile device configured to detect RFID's emitted from the vehicles 22A, 22B, and/or 22C, the mobile device could determine if a vehicle has come in to contact with the person in possession of the mobile device. So, for example, in a hit-and-run situation, if one of the vehicles 22A, 22B, and/or 22C hit a pedestrian in possession of the device, the device could record the RFID emitted by the vehicles 22A, 22B, and/or 22C. Law enforcement or forensic experts could then retrieve the RFID from the mobile device so as to determine the identity of the vehicle striking the person and/or the driver of the vehicle striking the person. Of course, should be understood, that the RFID data emitted by the vehicles 22A, 22B, and/or 22C may be encrypted so as to protect the identity of the person operating the vehicle and that only law enforcement or an appropriate authority has the ability to decrypt this encrypted data.

In the autonomous vehicle use-case, by utilizing and calibrating acceleration of RFID strength, it is possible to estimate the speed of approaching vehicle. This can again be used in conjunction with other autonomous technologies to improve vehicle guidance and safety.

Figure 7:
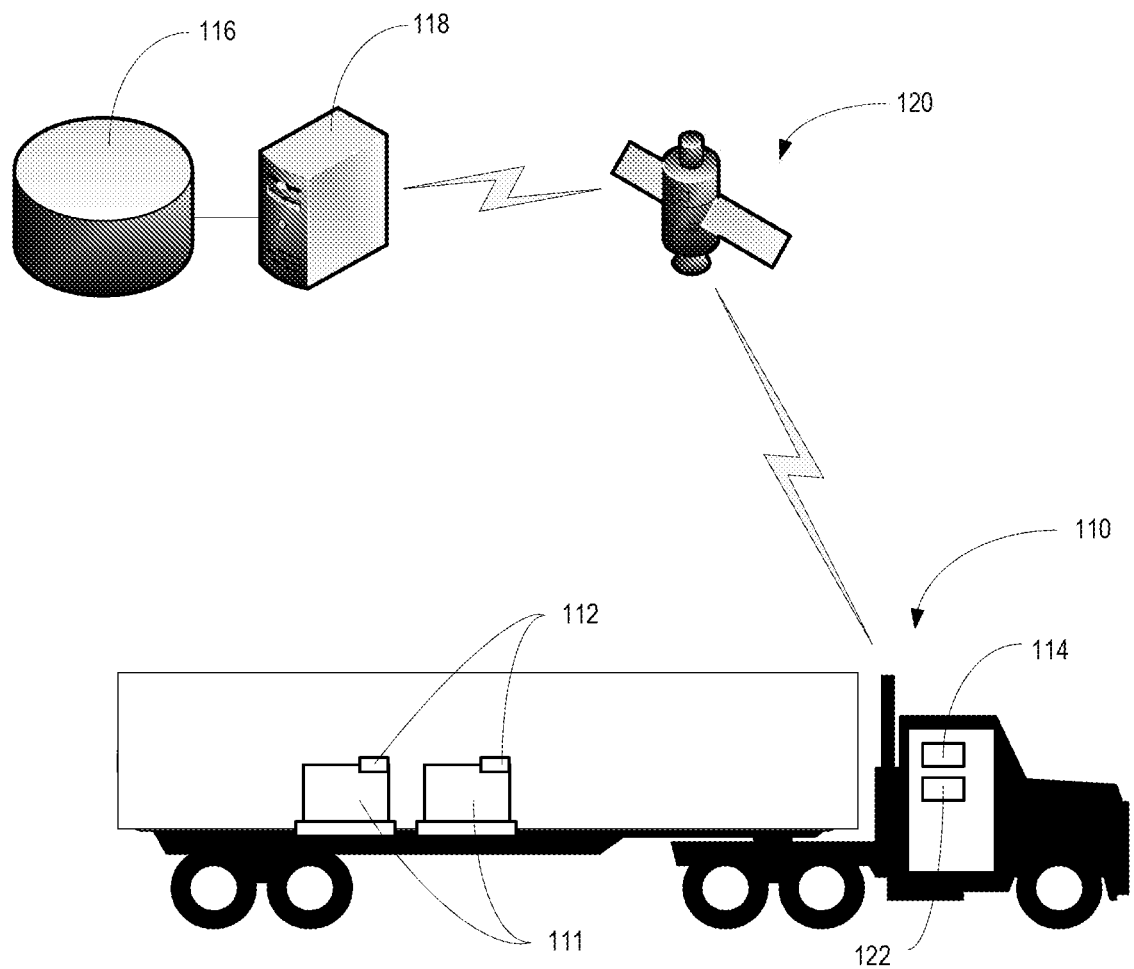
FIG. 7 illustrates a system that implements a shipment tracking use case.
Figure 7:
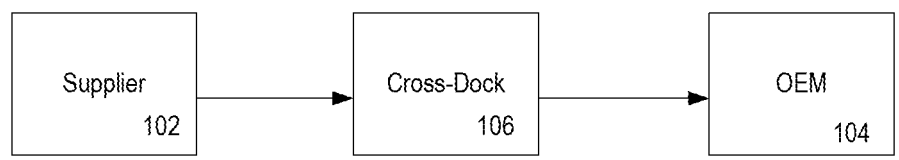

Another use case as illustrated in FIG. 7 is in tracking, book-keeping shipment in a truck 110 (e.g. FTL, LTL or milk-run). Typically, the shipments (for example from a supplier 102 to an automotive OEM 104) need to be tracked in order to plan and optimize manufacturing. The shipments and/or parts can and are usually tagged with a passive RFID tag 112 at least at the pallet/crate 111 level. However, the complete visibility on these shipments is still an issue, especially during various stages such as loading at a supplier 102 into truck 110, reshuffling/Transferring at a cross-dock 106 and unloading at an OEM 104 and during the transport. The motor carrier component of the truck 110 may include an active-RFID 114. The active-RFID 114 may include an RFID-reader and memory to store and monitor any changes in the passive-RFID components 112. Any changes may be transmitted to a server 118 for remote storage or analysis. With an active-RFID 114 on the motor-carrier component of the truck 110, with encrypted cloud-storage 116 through the server 118 over one or more networks 120, complete tracking can achieved at every moment and every stage carrying paired data vector with the yin number of truck, parts numbers on the truck at every stage and every moment, by concomitant use of a GPS devices 122. An important aspect may be the active RFID on the motor-carrier making the tracking data collection completely automatic and continuous by continually updating each and every change in any shipment/packages.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from spirit of this invention, as defined in the following claims.

The invention claimed is:

1. A system for remote identification of an item including one of a vehicle and a weapon in the vehicle, said vehicle and weapon each having a first active RFID tag which always transmits and receives an RFID signal, the system arranged within a law enforcement vehicle with a second active RFID tag which always transmits and receives an RFID signal and comprising:
a processor with a memory device for storing data entries;
an output device in communication with the processor;
an RFID receiver in communication with the processor, the RFID receiver configured to receive an RFID signal from the first active RFID tag, the receiver configured to provide the received RFID to the processor;
a network access device in communication with the processor, the network access device capable of being in communication with a remote database, the remote database having a table that cross references the RFID to a plurality of data entries;
wherein the processor is configured to transmit the received RFID from the first active RFID tag to the database via the network access device and receive from the database respective one of a make and a model of said vehicle including a vehicle identification number thereof, and a weapon identification number of the weapon;
wherein the processor is configured to receive an information from one or more other vehicles, each of said one or more other vehicles being equipped with an active RFID tag, said information including a make and a model of said one or more other vehicles including a vehicle identification number thereof; and
wherein the vehicle with the first active RFID tag comprises a memory for storing the information received from the RFID tags of said one or more other vehicles.

2. The system of claim 1, wherein the processor is configured to provide to an operator of the law enforcement vehicle an information about respective one of the make and the model of the vehicle including the vehicle identification number thereof, and the weapon identification number.

3. The system of claim 2, wherein when the item is missing or stolen, the processor is configured to provide to the operator of the law enforcement vehicle a warning about respective one of the make and the model of the vehicle including the vehicle identification number thereof, and the weapon identification number of the weapon.

4. The system according to claim 3, wherein the warning includes one of a display and a sound generated within the law enforcement vehicle.

5. The system according to claim 1, wherein the system is configured to utilize encrypted communications and signal transmissions, wherein said encrypted communications and signal transmissions can be stored in a continuous or semi-continuous manner.

6. The system according to claim 1, wherein the system is configured to utilize encrypted communications and signal transmissions, wherein said encrypted communications and signal transmissions can be decrypted only by a law enforcement agency.

7. A system for remote identification of an item including one of a vehicle and a weapon in the vehicle, said vehicle and weapon each having a first active RFID tag which always transmits and receives an RFID signal, the system arranged within a law enforcement vehicle with a second active RFID tag which always transmits and receives an RFID signal and comprising:
a processor with a memory device for storing data entries;
an output device in communication with the processor;
an RFID receiver in communication with the processor, the RFID receiver configured to receive an RFID signal from the first active RFID tag, the receiver configured to provide the received RFID to the processor;
a network access device in communication with the processor, the network access device capable of being in communication with a remote database, the remote database having a table that cross references the RFID to a plurality of data entries;
wherein the processor is configured to transmit the received RFID from the first active RFID tag to the database via the network access device and receive from the database respective one of a make and a model of said vehicle including a vehicle identification number thereof, and a weapon identification number of the weapon;
wherein the processor is configured to receive an information from one or more other vehicles, each of said one or more other vehicles being equipped with an active RFID tag, said information including a make and a model of said one or more other vehicles including a vehicle identification number thereof;
wherein the vehicle with the first active RFID tag comprises a memory for storing the information received from the RFID tags of said one or more other vehicles; and
wherein the active RFID tag of said one or more other vehicles always receives and transmits an RFID signal.

8. The system according to claim 7, wherein the system is configured to utilize encrypted communications and signal transmissions, wherein said encrypted communications and signal transmissions can be stored in a continuous or semi-continuous manner.

9. The system according to claim 7, wherein the system is configured to utilize encrypted communications and signal transmissions, wherein said encrypted communications and signal transmissions can be decrypted only by a law enforcement agency.

10. A system for remote identification of a plurality of items transported by a vehicle having a first RFID tag attached thereto, the first RFID tag being active RFID tag which always transmits and receives an RFID signal; and each of said plurality of items having a second RFID tag attached thereto, wherein the second RFID tag being an active RFID tag which always transmits and receives an RFID signal, the system comprising:
a processor with a memory device for storing data entries;
an output device in communication with the processor;
an RFID receiver in communication with the processor that automatically scans for RFIDs attached to said plurality of items in the vehicle over time, the RFID receiver configured to receive an RFID signals from said second RFID tags, the receiver configured to provide the received RFID to the processor;
a network access device in communication with the processor, the network access device capable of being in communication with a remote database, the remote database having a table that cross references the RFID to a plurality of data entries;
wherein the processor is configured to transmit the received RFID to the database via the network access device, the database history being accessible to provide a status of RFIDs read by the RFID receiver in the vehicle; and a plurality of sensors located within the vehicle, wherein the processor is configured to receive an information from the plurality of sensors upon an impact to the vehicle from one or more other vehicles, each of said one or more other vehicles being equipped with an active RFID tag, said information including a make and a model of said one or more other vehicles including a vehicle identification number thereof;

wherein the vehicle with the first active RFID tag comprises a memory for storing the information received from the RFID tags of said one or more other vehicles; and wherein when one or more of said plurality of sensors detect an impact from said one or more other vehicles, the processor records and stores the RFID of said one or more other vehicles including a signal strength of the RFID in said memory.

11. The system of claim 6, wherein the processor also transmits a location of the vehicle based on a GPS, location which is stored with and accessible with each RFID.

12. The system of claim 6, wherein the plurality of items includes one or more weapons, each attached with said RFID tag.

13. The system of claim 6, wherein the status of RFIDs includes information on one of the said plurality of items being placed on a pallet and said plurality of items being placed in a vehicle randomly.

14. The system according to claim 12, wherein each of said weapons include multiple RFID tags each configured to always transmit and receive RFID signal.

15. The system according to claim 10, wherein the system is configured to utilize encrypted communications and signal transmissions, wherein said encrypted communications and signal transmissions can be stored in a continuous or semi-continuous manner.

16. The system according to claim 10, wherein the system is configured to utilize encrypted communications and signal transmissions, wherein said encrypted communications and signal transmissions can be decrypted only by a law enforcement agency.

* * * * *

UNITED STATES PATENT AND TRADEMARK OFFICE
CERTIFICATE OF CORRECTION

| | |
|---|---|
| PATENT NO. | : 11,615,282 B2 |
| APPLICATION NO. | : 17/254621 |
| DATED | : March 28, 2023 |
| INVENTOR(S) | : Ravikumar Muppirala |

It is certified that error appears in the above-identified patent and that said Letters Patent is hereby corrected as shown below:

On the Title Page

In the title which reads:
"SYSTEM AND METHOD FOR REMOTE IDENTIFICATION OF HEMS"
Should read:
"SYSTEM AND METHOD FOR REMOTE IDENTIFICATION OF ITEMS"

In the Specification

Column 1, Line 2, delete "HEMS" and insert --ITEMS--.

Signed and Sealed this
Thirtieth Day of May, 2023

Katherine Kelly Vidal
*Director of the United States Patent and Trademark Office*